United States Patent [19]

Heffernan

[11] 4,047,380

[45] Sept. 13, 1977

[54] COMBUSTION SYSTEM USING DILUTE HYDROGEN PEROXIDE

[75] Inventor: Robert J. Heffernan, Portsmouth, R.I.

[73] Assignee: The United States of America as represented by the Secretary of the Navy, Washington, D.C.

[21] Appl. No.: 675,671

[22] Filed: Apr. 9, 1976

[51] Int. Cl.² .............................................. F02C 3/20
[52] U.S. Cl. ........................... 60/39.46 R; 60/39.46 M
[58] Field of Search .................. 60/39.46 R, 39.46 M, 60/218, 257, 259

[56] References Cited

U.S. PATENT DOCUMENTS

| | | | |
|---|---|---|---|
| 3,040,521 | 6/1962 | Broughton et al. | 60/39.46 M |
| 3,091,921 | 6/1963 | Youngquist et al. | 60/39.46 M |
| 3,135,703 | 6/1964 | Sill | 60/39.46 M |
| 3,898,794 | 8/1975 | Ariga | 60/39.46 M |

Primary Examiner—Carlton R. Croyle
Assistant Examiner—L. J. Casaregola

Attorney, Agent, or Firm—Richard S. Sciascia; Arthur A. McGill; Prithvi C. Lall

[57] ABSTRACT

A combustion system using a dilute hydrogen peroxide($H_2O_2$) solution as an oxidizer. The system uses the concept of Liquid Phase Extraction and eliminates part of the water produced during the decomposition of hydrogen peroxide into water ($H_2O$) and oxygen ($O_2$). The elimination of a part of the water produced during the decomposition allows the energy resulting from the combustion of oxygen and a fuel to be used to increase the prime mover performance of the system. The system comprises a decomposition chamber, a liquid/gas separator, a heat exchanger and a combustion chamber. Dilute hydrogen peroxide solution is catalytically decomposed in the decomposition chamber. The oxygen and the water produced during the decomposition of $H_2O_2$ are separated by means of the separator. Some portion of the separated water is extracted. The mixture of oxygen and the remaining water is combined in the combustion chamber with the fuel and is ignited, producing hot gases under high pressure for a prime mover such as a turbine engine.

8 Claims, 8 Drawing Figures

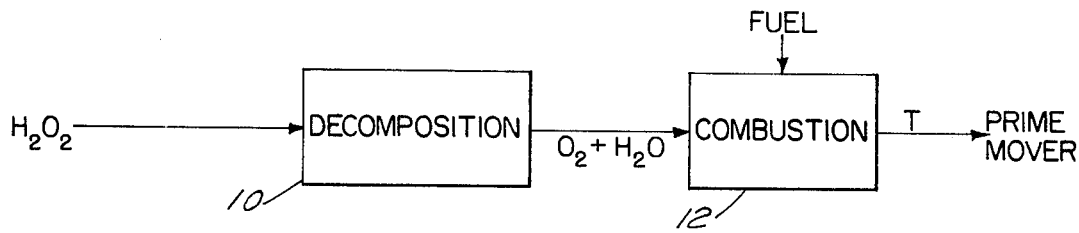
FIG. 1
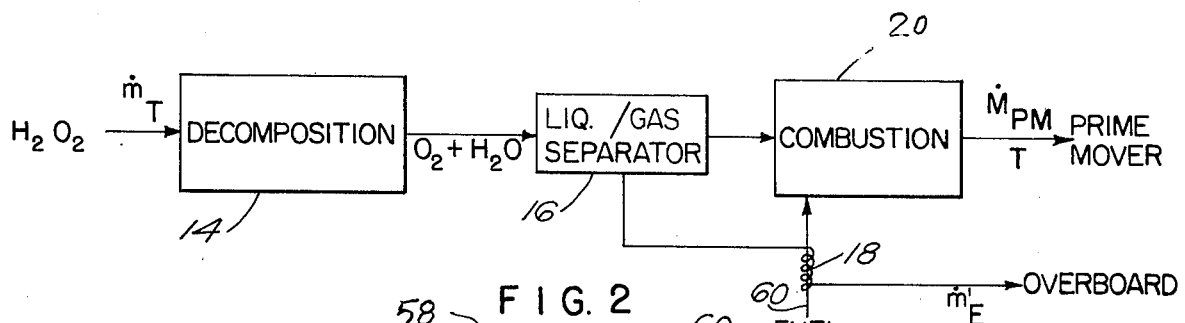
FIG. 2
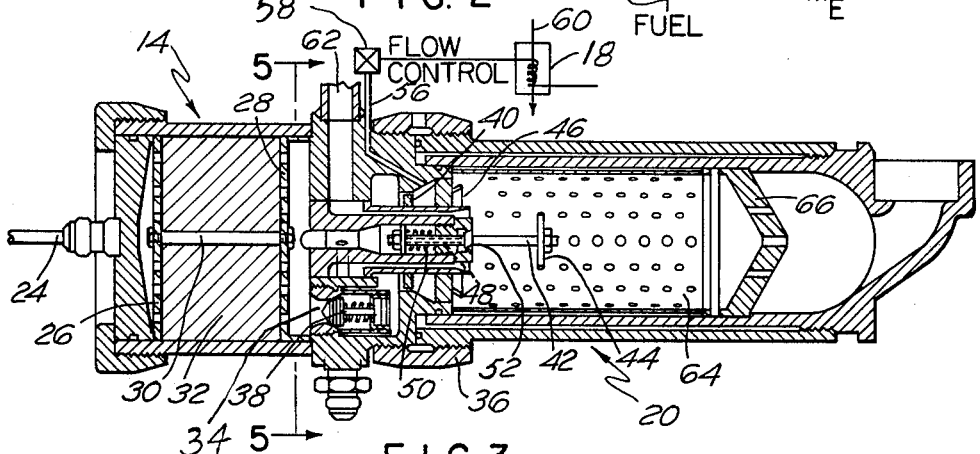
FIG. 3
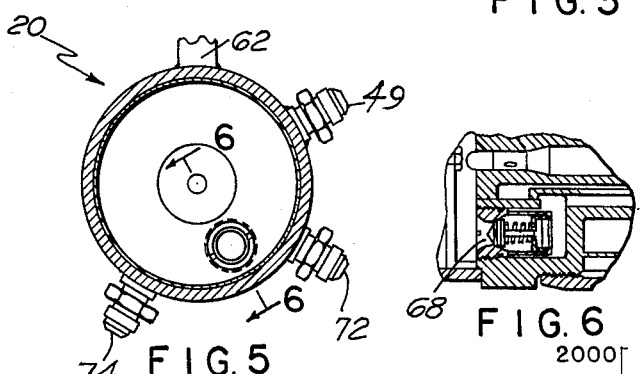
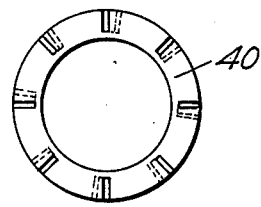
FIG. 5
FIG. 6
FIG. 4
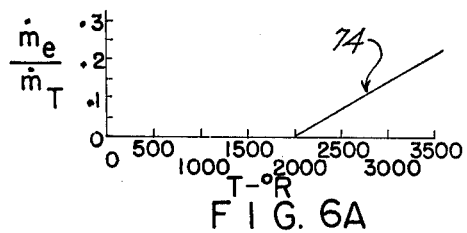
FIG. 6A
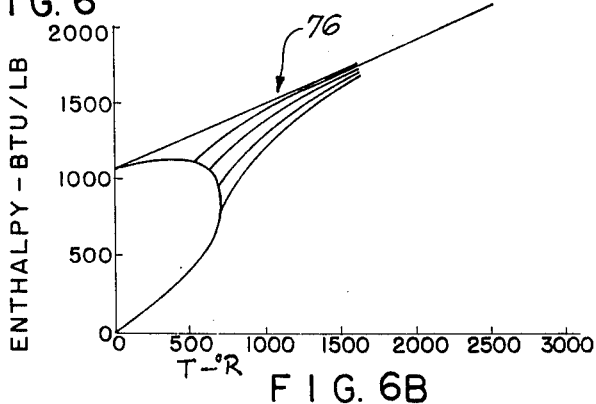
FIG. 6B

COMBUSTION SYSTEM USING DILUTE HYDROGEN PEROXIDE

STATEMENT OF GOVERNMENT INTEREST

The invention described herein maybe manufactured and used by or for the Government of the United States of America for governmental purposes without the payment of any royalties thereon or therefor.

BACKGROUND OF THE INVENTION

This invention relates to a combustion system which uses hydrogen perioxide as a propellant and more particularly to a combustion system which uses dilute solution of hydrogen peroxide and a fuel as a propellant.

Propulsion systems, and particularly those used in underwater applications, have used hydrogen peroxide as a propellant for many years. Although sometimes it is used as a monopropellant, it is often used as an oxygen source, i.e., an oxidizer, in combination with a fuel. In such a conventional system, concentrated hydrogen peroxide ($H_2O_2$) is delivered into a decomposition chamber where it is catalytically decomposed to form oxygen ($O_2$) gas and $H_2O$. This process being exothermic results in the generation of heat called "heat of decomposition". $O_2$ and $H_2O$ produced then proceed into a combustion chamber where oxygen is combined with a fuel in a stoichiometric ratio. This mixture is then ignited to produce hot gas under pressure which is delivered to a prime mover such as a turbine, piston or a rotary engine. The $H_2O$ produced during decomposition serves to depress the final combustion temperature and becomes part of the working fluid delivered to the prime mover. The decomposition of high concentrations of $H_2O_2$ results in the generation of $O_2$ and $H_2O$ as a satuated vapor. At lower concentrations (less than 67% or so), however, the quality of $H_2O$ drops due to the lower heat of decomposition and liquid phase $H_2O$ is present. Increasing the pressure in the system further increases the percentage of liquid $H_2O$ present. As an example, decomposition of 40% concentration $H_2O_2$ at 1400 PSI (pounds per square inch), results in the generation of oxygen ($O_2$) gas and $H_2O$ and $H_2O$ so produced being completely in the liquid phase. When the liquid phase $H_2O$ produced during the decomposition process enters the combustion chamber, it is vaporized and superheated to the equilibrium temperature of the overall combustion process. The heat required to vaporize and superheat the liquid $H_2O$ is supplied by the energy resulting from the combustion of $O_2$ and the fuel. This lowers the final temperature of the mixture being delivered to the prime mover and results in lower prime mover performance. It is thus desirable to remove the liquid phase $H_2O$ produced during the decomposition before the combustion process and thus prevent reduction of performance of the prime mover by increasing the temperature of the hot gas, which in turn improves the overall performance of the prime mover despite the decrease in performance due to decrease, due to $H_2O$ extraction, in the mass of hot gas delivered to the prime mover.

SUMMARY OF THE INVENTION

The combustion system using dilute hydrogen peroxide and a fuel as propellant and built according to the teachings of subject invention comprises a decomposition chamber where dilute solution of hydrogen peroxide (40% concentration or less by weight) is catalytically decomposed into $H_2O$ and $O_2$. The $H_2O$ and $O_2$ so produced in the decomposition chamber are led to a liquid/gas separator which includes a pair of whirl like structures which rotate and separate some of the liquid $H_2O$ which moves farther from the axis of rotation than $O_2$. The separated liquid $H_2O$ is then extracted and the remaining liquid $H_2O$ and $O_2$ are led to the combustion chamber where they are mixed with the fuel. An igniter is ignited in the combustion chamber which produces sufficiently high pressure and temperature before the mixture of $O_2$, the remaining $H_2O$ and the fuel are burnt to produce hot gases under high pressure which are used to propel a prime mover. The extracted $H_2O$ is circulated in a heat exchanger wherein the incoming fuel is also brought in so as to extract most of the heat from the extracted $H_2O$ before the fuel is brought into the combustion chamber.

An object of subject invention is to have a combustion system using low concentration hydrogen peroxide and a fuel as propellant for a prime mover such as turbine engine etc.

Another object of subject invention is to have a combustion system using hydrogen peroxide and a fuel as a propellant having increased safety through the use of lower concentrations of hydrogen peroxide while obtaining the performance of the prior art system using higher concentrations of hydrogen peroxide.

Still another object of subject invention is to have a combustion system which extracts a part of liquid $H_2O$ produced during the decomposition of $H_2O_2$.

Still another object of this invention is to have a combustion system which uses a heat exchanger to circulate the extracted $H_2O$ to raise the temperature of the incoming fuel before feeding it into the combustion chamber of the combustion system for ignition.

Other objects, advantages and novel feature of this invention will become apparent from the following detailed description of the invention when considered in conjunction with the accompanying drawings wherein:

BRIEF DESCRIPTION OF THE DRAWINGS

FIG. 1 shows a block diagram of a combustion system using concentrated $H_2O_2$ and a fuel as a propellant;

FIG. 2 is a block diagram of a combustion system using low concentration $H_2O_2$ and a fuel as a propellant;

FIG. 3 is a cross-sectional view of a combustion system built according to the teachings of subject invention;

FIG. 4 is a plan view of the separator used in the combustion system of FIG. 3;

FIG. 5 is a cross-section of the combustion system taken along line 5—5 of FIG. 3;

FIG. 6 is a cross-section of the system taken along line 6—6 of FIG. 5;

FIG. 6A is a graphical representation of the ratio of the rate of $H_2O$ extracted to the rate of production of the components of decomposition mixture when plotted against temperature in the combustion chamber; and FIG. 6B is a graphical representation of enthalpy of the system when plotted against the temperature in the combustion chamber of the system.

DESCRIPTION OF A PREFERRED EMBODIMENT

Referring to the drawings wherein like reference characters designate like parts throughout, and more particularly to FIG. 2 thereof a block diagram of a combustion system according to the teachings of subject invention is shown. FIG. 1 is a schematic representation of a conventional combustion system wherein a concentrated solution of hydrogen peroxide ($H_2O_2$) is sent into a decomposition chamber 10. The output of decomposition chamber 10 comprising mixture of oxygen ($O_2$) and liquid $H_2O$ is fed into combustion chamber 12 where the oxygen ($O_2$) is used to ignite the incoming fuel which is used for a prime mover such as a turbine or a piston. For a conventional combustion system using concentrated $H_2O_2$ (70% or higher $H_2O_2$ by weight), the amount of heat produced as a result of catalytic decomposition of $H_2O_2$ raises the $H_2O$ and $O_2$ produced to a high temperature. Furthermore, the amount of $H_2O$ produced during the decomposition of concentrated $H_2O_2$ is not sufficient enough to lower the temperature of the hot gases resulting from the combustion of the $O_2$ produced and a fuel to an acceptable operating temperature range of the prime mover. Thus additional water is needed to lower the temperature of the hot gases used for the prime mover to reduce the chance of explosion in the system using concentrated $H_2O_2$ and a fuel as propellant.

FIG. 2 represents a combustion system built according to the teachings of subject invention wherein hydrogen peroxide in dilute solution, preferably 40% $H_2O_2$ by weight, is fed into decomposition chamber 14 wherein it is catalytically decomposed, using Argent or its equivalent as a catalytic agent, into its consituents, i.e., ($O_2$ and $H_2O$). Under the conditions (concentration of $H_2O_2$ and the pressure) in chamber 14, $H_2O$ produced is mostly in liquid phase. Furthermore, the temperature of the decomposed components is also not very high. The output of decomposition chamber 14 is then fed into a liquid/gas separator 16 wherein a part of the liquid phase $H_2O$ is extracted and taken to a heat exchanger 18. The remaining $H_2O$ and $O_2$ are then delivered into combustion chamber 20. The extracted water because of high pressure (1400 pounds per square inch) is still in liquid phase and while going through the heat exchanger rejects its heat to the incoming fuel and is piped overboard as shown in FIG. 2. The fuel is then fed into chamber 20 where it is ignited after mixing it with $O_2$ and the remaining $H_2O$. The output of combustion chamber 20 is a mixture of hot gases under high pressure which is used to drive a prime mover such as a turbine engine. As shown in FIG. 6A, the temperature of the oxygen and the remaining $H_2O$ increase linearly with the ratio of the extracted flow to the total flow (i.e. the rate at which hot gases are delivered to the prime mover). Furthermore, it is known in the prior art that within the operating range of temperature of a combustion system, the output of a prime mover of fixed dimensions and with a fixed fuel supply increases with the increase of temperature of the hot gases delivered to the prime mover. FIG. 6B further illustrates the effect of the $H_2O$ extraction in the form of a plot between enthalpy of the system (i.e. of the hot gases produced after combustion) and the temperature of the system. FIG. 6B shows that the amount of heat required to change the phase (from liquid phase to vapor phase) of the liquid phase $H_2O$ without any increase in the temperature of the system is much higher than the amount of heat required to raise the temperature of the system if the liquid phase of $H_2O$ is eliminated. Consequently, a large amount of heat which would have been required to change the phase of the liquid phase $H_2O$ which has been eliminated, is used to increase the temperature of the system and thus improve the performance of the system which is a linear function of its temperature.

As shown in FIG. 3 a dilute solution of hydrogen peroxide, preferably (40% $H_2O_2$ by weight) is fed into decomposition chamber 14 of the combustion system by means of pipe 24. Hydrogen peroxide entering the decomposition chamber 14 is distributed throughout the entire available space of the decomposition chamber 14 by means of deflection or distribution plate 26 having a plurality of holes therethrough. The decomposition chamber 14 also includes another distribution or deflection plate 28 having a plurality of holes which is held in position together with deflection or distribution plate 26 by shaft 30. Screen 32, preferably made of stainless steel and coated with a catalytic agent such as Argent for decomposing $H_2O_2$, inside decomposition chamber 14 is also held in place by means of shaft 30 and deflection or distribution plates 26 and 28. Liquid $H_2O$ and $O_2$ produced after decomposition of $H_2O_2$ inside chamber 14 are allowed to enter area 34 of chamber 36 through passageway 38 as shown in FIG. 3. Phase separator 40 is mounted at one end of shaft 42 which has a flame holder or flame deflector 44 at the other end thereof. Separator 46 is also mounted on shaft 42. Shaft 42 has a hole 48 drilled through the center thereof for the passage of fuel coming via line 60 to inlet 49 and finally to combustion chamber 20. Spring 50 is put under tension due to the pressure of incoming fuel so as to open inlet 52 for allowing fuel into the combustion chamber 20. Outlet line 56 is provided in the combustion chamber to extract some of the liquid phase $H_2O$ produced during the decomposition of dilute solution of hydrogen peroxide. Line 56 also has a flow control 58 installed which has its output leading to heat exchanger 18 where $H_2O$ loses most of its heat to the incoming fuel through line 60. A conventional igniter is brought via inlet 62 into the combustion chamber 20 to ignite and to bring the temperature and pressure inside the combustion chamber 20 to the point of bringing about effective combustion. Combustion chamber 20 has a inner liner 64 to cause some turbulence in the mixture of $O_2$, $H_2O$ and the fuel in order to mix the fuel with oxygen gas. Restrictor 66 is used to further enhance the combustion reaction before the hot gases produced during combustion of $O_2$ and the fuel are delivered through a nozzle to a prime mover such as a turbine. FIG. 4 is a plan view of phase separator 40 which is a whirl like structure mounted on shaft 42. Another similar whirl like structure 46 is also mounted on shaft 42. When fixed separators 40 and 46 rotate the fluid about an axis through shaft 42, they move liquid phase $H_2O$ farther away from the axis leaving $O_2$ gas closer to the axis. Part of the separated $H_2O$ is extracted through outlet line 56. FIG. 5 is cross section of FIG. 3 taken along line 5—5 wherein inlet 72 is provided to keep the combustion chamber cool by circulating water therethrough and fitting 74 is used for the system start-up using some auxiliary means such as pressurized air. FIG. 6 is a cross section of FIG. 5 taken along line 6—6 wherein a conventional check valve 68 is shown to control the flow of $O_2$ and the $H_2O$ produced during the decomposition of dilute $H_2O_2$ into the combustion chamber 20.

As pointed out above, FIG. 6A is graphical representation of the relationship between the ratio of the rate of extraction of $H_2O$ produced during the decomposition of dilute $H_2O_2$ and rate of production of the total mass of hot gases produced and the temperature of the system (i.e. hot gases in the combustion chamber). Straight line 74 indicates that the temperature of the combustion system increases as the ratio of the extracted flow to the total flow increases, which in turn changes the efficiency of the combustion system. FIG. 6B shows graphically a relationship between enthalpy and the temperature of the system (i.e. hot gases produced in the combustion chamber). Line 76 indicates that the heat provided to the system in vapor phase goes to increase the temperature of the system and thereby increases its efficiency. However, other curves plotted at various pressures indicate that a large amount of heat provided is used up to change the phase of $H_2O$ present from liquid phase to vapor phase without changing the temperature of the system. Thus a large amount of heat energy is used for this purpose which would be made available to raise the temperature of the system if most of the liquid phase $H_2O$ is removed therefrom.

Thus a combustion system of the present invention comprises a decomposition chamber which is used to decompose dilute $H_2O_2$ into its components, i.e., liquid $H_2O$ and $O_2$. Liquid $H_2O$ and $O_2$, so produced is separated by using a separator and some of liquid $H_2O$ is extracted before delivering the remaining $H_2O$ and $O_2$ into the combustion chamber where they are mixed with a fuel before starting their combustion reaction. The hot gases under pressure produced in the combustion chamber are then delivered through a nozzle to a prime mover such as a turbine or the piston of an engine.

Obviously many modification and variations of the present invention are possible in the light of the above teachings. As an example a catalytic agent for the decomposition of $H_2O_2$ can be something other than Argent. Furthermore, the separator means for extracting liquid $H_2O$ from the components of decomposed $H_2O_2$ can vary in design. It is therefore understood that within the scope of the appended claims the invention may be practiced otherwise than as specifically described.

I claim:

1. A combustion system using dilute hydrogen peroxide having a concentration less than 40 percent by weight and a fuel propellant which comprises:
   a decomposition chamber for catalytically decomposing the dilute hydrogen peroxide having a concentration less than 40 percent by weight into liquid phase water and vapor phase oxygen as the decomposed components thereof;
   a liquid/gas separator means for separating the liquid phase water and vapor phase oxygen of the decomposed dilute hydrogen peroxide, said separater means being mounted adjacent said decomposition chamber and being connected to said decomposition chamber;
   means for feeding the components of the decomposed dilute hydrogen peroxide from said decomposition chamber into said liquid/gas separator means;
   means for extracting a portion of the liquid phase water from the components of the decomposed dilute hydrogen peroxide being fed to said separater means; and
   a combustion chamber for mixing the oxygen and the remaining water with the fuel and for igniting the mixture thereof, said combustion chamber being mounted adjacent said separater means and being connected to said separater means.

2. The combustion system of claim 1 wherein said decomposition chamber includes a pair of distribution plates being held in position by a shaft and having a screen being connected between said pair of distribution plates.

3. The combustion system of claim 2 wherein said screen of said decomposition chamber includes a catalytic agent for decomposing the dilute hydrogen peroxide coated thereon.

4. The combustion system of claim 3 wherein said separator means comprises two whirl like structures.

5. The combustion system of claim 4 wherein said means for feeding the components of the decomposed dilute hydrogen peroxide includes a check valve therein for preventing explosive mixture from said combustion chamber from entering said decomposition chamber.

6. The combustion system of claim 5 wherein said combustion chamber further includes means for raising pressure and temperature inside said combustion chamber to increase the combustion process inside said combustion chamber.

7. The combustion system of claim 6 wherein said combustion chamber further includes a one way valve means for bringing the fuel into said chamber.

8. The combustion system of claim 7 wherein said one way valve means includes a spring being put under tension due to the pressure of the fuel so as to permit entrance of the fuel inside said combustion chamber.

* * * * *